(12) United States Patent
Zhao et al.

(10) Patent No.: US 11,700,630 B2
(45) Date of Patent: Jul. 11, 2023

(54) ELECTRONIC DEVICE AND METHOD FOR THE ELECTRONIC DEVICE

(71) Applicant: Sony Group Corporation, Tokyo (JP)

(72) Inventors: Youping Zhao, Beijing (CN); Yiteng Wang, Beijing (CN); Xin Guo, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 154 days.

(21) Appl. No.: 17/226,119

(22) Filed: Apr. 9, 2021

(65) Prior Publication Data

US 2021/0227554 A1 Jul. 22, 2021

Related U.S. Application Data

(63) Continuation of application No. 16/310,833, filed as application No. PCT/CN2017/092158 on Jul. 7, 2017, now Pat. No. 11,039,450.

(30) Foreign Application Priority Data

Jul. 29, 2016 (CN) .......................... 201610616478.6

(51) Int. Cl.
| | | |
|---|---|---|
| H04W 72/00 | (2023.01) | |
| H04W 72/541 | (2023.01) | |
| H04W 72/04 | (2023.01) | |
| H04W 16/10 | (2009.01) | |
| H04W 72/54 | (2023.01) | |
| H04W 72/542 | (2023.01) | |
| H04W 16/14 | (2009.01) | |

(52) U.S. Cl.
CPC ......... *H04W 72/541* (2023.01); *H04W 16/10* (2013.01); *H04W 16/14* (2013.01); *H04W 72/04* (2013.01); *H04W 72/54* (2023.01); *H04W 72/542* (2023.01)

(58) Field of Classification Search
None
See application file for complete search history.

(56) References Cited

U.S. PATENT DOCUMENTS

| | | |
|---|---|---|
| 2009/0245085 A1 | 10/2009 | Tao et al. |
| 2010/0303026 A1 | 12/2010 | Chaudhri et al. |
| 2011/0028180 A1 | 2/2011 | Sawai |
| 2012/0134328 A1 | 5/2012 | Gauvreau et al. |

(Continued)

FOREIGN PATENT DOCUMENTS

| | | |
|---|---|---|
| CN | 102612042 A | 7/2012 |
| CN | 103702432 A | 4/2014 |

(Continued)

OTHER PUBLICATIONS

English-language translation of International Search Report and Written Opinion for International Application No. PCT/CN2017/092158, dated Aug. 30, 2017.

(Continued)

*Primary Examiner* — Alex Skripnikov
(74) *Attorney, Agent, or Firm* — Xsensus LLP

(57) ABSTRACT

Provided are an electronic device and a method for an electronic device. The electronic device comprises a processing circuit, configured to: determine sub-system in specific region, and based on relative interference between the sub-systems and quality of service requirements for the sub-systems, clustering the sub-systems.

18 Claims, 9 Drawing Sheets

(56) References Cited

U.S. PATENT DOCUMENTS

| | | |
|---|---|---|
| 2012/0309406 A1 | 12/2012 | Xu |
| 2014/0080533 A1 | 3/2014 | Tabrizi et al. |
| 2014/0241259 A1 | 8/2014 | Wu et al. |
| 2015/0003322 A1 | 1/2015 | Pyattaev et al. |
| 2015/0072700 A1 | 3/2015 | Hwang et al. |
| 2015/0237609 A1 | 8/2015 | Sun |
| 2015/0257185 A1 | 9/2015 | Yuan-Wu |

FOREIGN PATENT DOCUMENTS

| | | |
|---|---|---|
| CN | 103974261 A | 8/2014 |
| CN | 103987046 A | 8/2014 |
| WO | 2014/036856 A1 | 3/2014 |
| WO | 2015/084149 A1 | 6/2015 |
| WO | 2015/158124 A1 | 10/2015 |
| WO | 2016/077949 A1 | 5/2016 |
| WO | 2016/115990 A1 | 7/2016 |

OTHER PUBLICATIONS

Extended European Search Report dated May 23, 2019 in European Application No. 17833416-5.

ELECTRONIC DEVICE AND METHOD FOR THE ELECTRONIC DEVICE

CROSS-REFERENCE TO RELATED APPLICATIONS

This application is a continuation of U.S. application Ser. No. 16/310,833, filed Dec. 18, 2018, which is a National Stage Application based on PCT/CN2017/092158, filed on Jul. 7, 2017, and claims priority to Chinese Patent Application No. 201610616478.6, titled "ELECTRONIC DEVICE AND METHOD FOR THE ELECTRONIC DEVICE", filed on Jul. 29, 2016 with China National Intellectual Property Administration, the entire contents of each are incorporated herein by reference in its entirety.

FIELD OF THE INVENTION

Embodiments of the present disclosure generally relate to the field of wireless communications, in particular to spectrum resource management in a wireless communication system using the cognitive radio technology, and more particular to an electronic apparatus and a method for the electronic apparatus.

BACKGROUND OF THE INVENTION

With the development of wireless communication technology, demands of a user for high quality, a high speed, a new service is higher and higher. A wireless communication operator and a device manufacturer should continuously improve a system to meet the demands of the user. In this case, a large amount of spectrum resources are required to support the new service arising continuously, and to meet requirements of high-speed communications, and the spectrum resources may be quantized with a parameter such as time, frequency, band width, allowable maximum emitting power.

Currently, limited spectrum resources have been allocated to fixed operators and services, new available spectrum is very rare or expensive. Yet, a large number of actual measurement results indicate that generally the utilization rate of the allocated licensed spectrum is not high. In this case, a concept of dynamic spectrum usage is proposed, that is, spectrum resources which have been allocated to certain services but are not utilized sufficiently are utilized dynamically.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an electronic apparatus is provided, which includes processing circuitry configured to: determine secondary systems in a particular area; and cluster, based on relative interferences among the secondary systems and quality of service requirements of the secondary systems, the secondary systems.

According to another aspect of the present disclosure, a method for an electronic apparatus is provided, including: determining secondary systems in the particular area; and clustering, based on relative interferences among the secondary systems and quality of service requirements of the secondary systems, the secondary systems.

According to other aspects of the present disclosure, there are further provided computer program codes and computer program products for methods for the electronic apparatus as well as a computer-readable storage medium recording the computer program codes for implementing the methods.

With the electronic apparatus and the method according to embodiments of the present disclosure, the secondary systems in the particular area are collectively clustered based on relative interferences among the secondary systems relative to the quality of service requirements, so that the quality of service may be guaranteed based on the quality of service requirements of the secondary systems, and serious co-channel interferences can be avoided.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Figure 1:
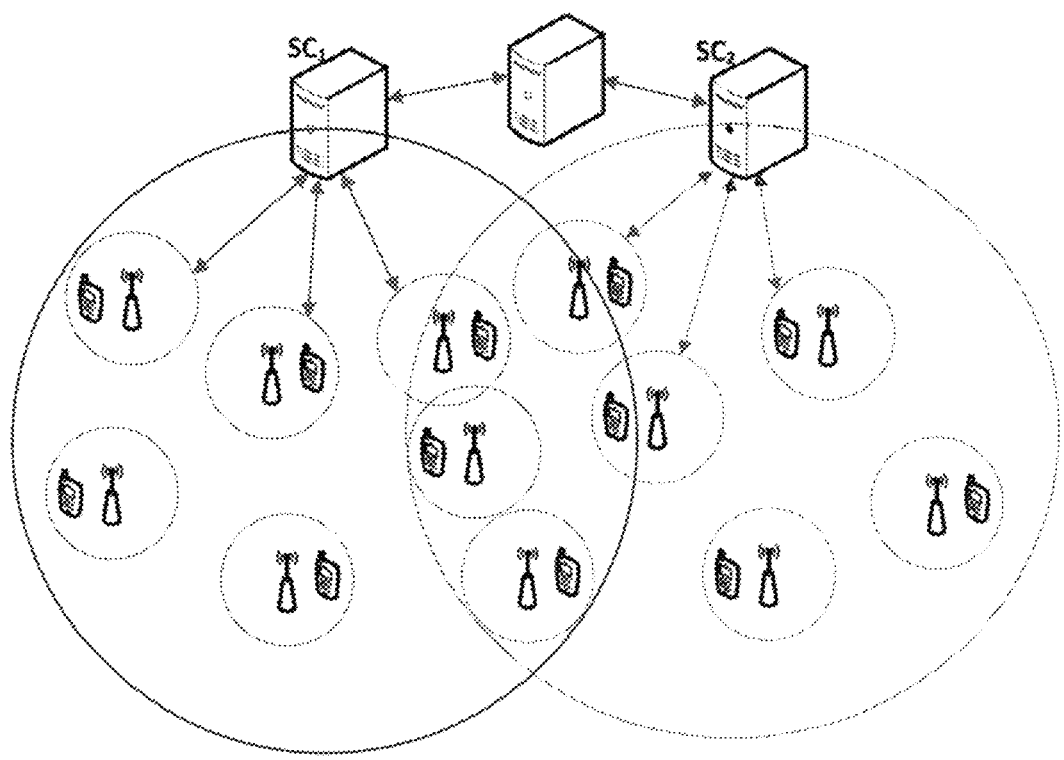
FIG. 1 is a schematic diagram showing a scenario of a cognitive radio system.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

Cognitive Radio System

The cognitive radio (CR) technology is intelligent evolution of the software radio technology. With the CR technology, an unlicensed user can dynamically access to licensed spectrum according to a certain rule, thereby greatly improving an actual spectrum utilization rate. Multiple transceiving mechanisms with a cognitive function form a cognitive radio system (CRS), which is also referred to as a dynamic spectrum access (DAS) system. It can be regarded that the cognitive radio system includes a primary system and a secondary system. The primary system refers to a system which is licensed to use the spectrum, and the secondary system refers to an unlicensed communication system which dynamically accesses to the licensed spectrum according to a certain rule. In addition, a functional module called spectrum coordinator (SC) is provided to manage the secondary systems and allocate resources for the secondary systems. Further, a public spectrum coordinator (P-SC) may be further provided to manage multiple spectrum coordinators.

Alternatively, the secondary system may also be a system with the right of using the spectrum, but have a lower priority level than the primary system in using the spectrum. For example, when an operator deploys a new base station to provide a new service, the existing base stations and the provided services function as the primary system and have a priority in using the spectrum.

As an application example, the cognitive radio system includes a broadcast and television system and a wifi communication system. Specifically, the broadcast and television spectrum itself is allocated to the broadcast and television system, therefore, the broadcast and television system is a primary system, and may include a primary user base station (for example, a television tower) and multiple primary users (for example, televisions). The wifi communication system is a secondary system, and may each include a secondary user base station (for example, a wifi access point) and a secondary user (for example, a portable computer). In the cognitive radio system, spectrum of a channel, on which no program is played or spectrum of an adjacent channel on the digital broadcast and television spectrum can be utilized dynamically to perform wifi communication, without interfering with the television signal reception.

Specifically, a UHF frequency band is allocated to the broadcast and television service, and therefore, the broadcast and television system has the highest priority level in the UHF frequency band, and is a primary system. In addition, spectrum resources in the UHF frequency band, which are not used by the broadcast and television system during a certain time period or within a certain area, can be allocated to the other communication system such as the wifi communication system described above or a mobile communication system.

In the communication manner in which the primary system and the secondary system coexist, it is required that an application of the secondary system does not have an adverse effect on an application of the primary system, alternatively, an influence of spectrum usage of the secondary system can be controlled to be within an allowable range of the primary system. In the case that the interferences on the primary system are ensured to be within a certain range, that is, does not exceed an interference threshold of the primary system, resources of the primary system usable by the secondary systems can be allocated to multiple secondary systems.

It should be understood by those skilled in the art that a case that the primary system is the broadcast and television system is described above, however, the present disclosure is not limited thereto. The primary system may be the another communication system having a legal usage right of spectrum, for example, a mobile communication system, and the secondary system may also be the another system which needs to use the spectrum resources to perform communication, for example, an intelligent meter reading system.

In the embodiment of the present disclosure, the secondary system is a wireless communication system, which may be understood as a combination of multiple devices having transmitting and receiving functions. For example, the wireless communication system may be a set of all base stations and user equipment belonging to the same mobile operator, or a set of all base stations and user equipment using the same communication scheme for the same mobile operator. The wireless communication system may also be a subset of the above set, for example, including base stations and user equipment in a management area of a spectrum coordinator. In addition, the wireless communication system may be a set of base stations and user equipment belonging to different mobile operators but using the same communication scheme, or a subset thereof similar to the subset described above. In another aspect, the wireless communication system may also be a set of base stations and user equipment belonging to the same service provider, or a subset thereof similar to the subset described above. As an example, in a case of an LTE communication system, the wireless communication system may be a subset of the LTE communication system, for example a set of subsystems on a cell level. The subsystem on the cell level may, for example, include a base station (a macro base station or a small base station) and one or more of user equipment. Of course, the wireless communication system is not limited to the LTE communication system or its subset, and may be a communication system of other types or its subset, for example a wife communication system or its subset, etc. In addition, in some examples, for example in a device to device communication scenario, the wireless communication system may be understood as a device cluster formed by multiple user equipment.

FIG. 1 shows a schematic diagram of a scenario of a cognitive radio system. For conciseness, the secondary system is indicated as a transceiver pair in FIG. 1. However, it should be understood that FIG. 1 shows only an example, and the secondary system may be any wireless communication system described above.

FIG. 1 shows an example of two spectrum coordinators $SC_1$ and $SC_2$. $SC_1$ and $SC_2$ share a same resource pool. An area managed by $SC_1$ is indicated by a large circle on the left, and an area managed by $SC_2$ is indicated by a large circle on the right. It can be seen that $SC_1$ and $SC_2$ have an overlapping area. In addition, an example of the secondary systems managed by $SC_1$ is indicated by a small circle in a solid line, and an example of the secondary systems managed by $SC_2$ is indicated by a small circle in a dashed line. In the above mentioned overlapping area, there may be both the secondary systems managed by $SC_1$, and the secondary systems managed by $SC_2$. If spectrum coordinators independently allocate the spectrum resources by themselves, the situation that adjacent secondary systems use the same spectrum resources to perform data transmission may occur, which can generate serious co-channel interference, so that it is difficult to guarantee the communication quality of the secondary systems.

In addition, FIG. 1 further shows that a public spectrum coordinator (P-SC) controls operations of two spectrum coordinators $SC_1$ and $SC_2$. However, it is not limiting. The spectrum coordinators $SC_1$ and $SC_2$ may be controlled by different P-SC, or no P-SC is provided. Moreover, the number of the spectrum coordinators which have the overlapping management areas with each other is not limited to two, and there may be more. For ease of understanding, the scenario shown in FIG. 1 is used as an example in the description of embodiments of the present disclosure below, which however is not restrictive.

First Embodiment

Figure 2:
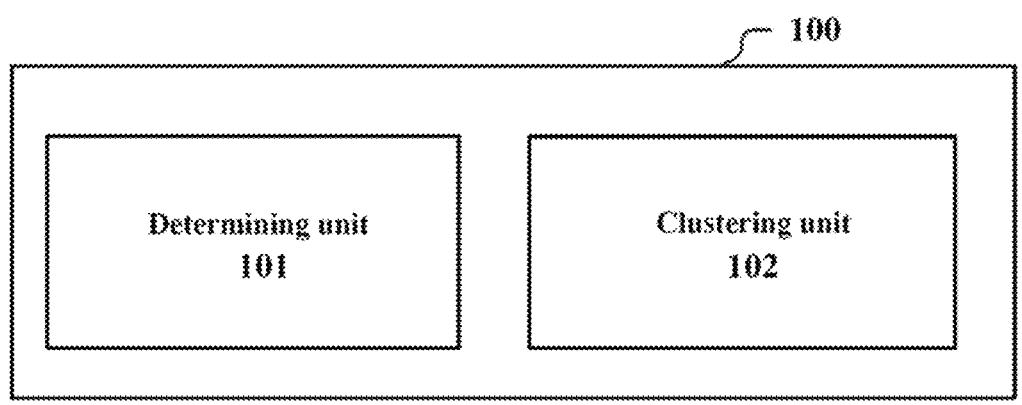
FIG. 2 is a block diagram showing functional modules of an electronic apparatus according to an embodiment of the present disclosure.

FIG. 2 shows a block diagram of functional modules of an electronic apparatus 100 according to an embodiment of the present disclosure. The electronic apparatus 100 includes: a determining unit 101, configured to determine secondary systems in a particular area, and a clustering unit 102, configured to cluster, based on relative interference among the secondary systems and quality of service requirements of the secondary systems, the secondary systems.

The determining unit 101 and the clustering unit 102 may, for example, be implemented by one or more processing circuits. The processing circuits may be implemented as a chip, for example.

The particular area here may be any area, such as an overlapping area of areas managed by multiple spectrum coordinators, and a part or all of the management area of a single spectrum coordinator. The particular area may be determined by the determining unit 102 according to geographical location information.

As described above, when the management areas of multiple spectrum coordinators overlap with each other, the secondary systems in the overlapping area may generate serious co-channel interferences due to use of the same spectrum resources to perform data transmission. In this embodiment, the electronic apparatus 100 determines the secondary systems in the overlapping area by using determining unit 101, and clusters these secondary systems by using the clustering unit 102, thereby effectively avoiding occurring of co-channel interferences.

For example, the determining unit 101 may determine the overlapping area according to geographical location information, and then determines the secondary systems in the overlapping area. The geographical location information may be obtained by referring to a geographical location database, for example.

Alternatively, information of the respective management areas may be interchanged among multiple spectrum coordinators, so that the spectrum coordinators may determine the overlapping area according to the information, and further determine the secondary systems in the overlapping area. In other words, the determining unit 101 may obtain the information of the overlapping area from the spectrum coordinator and determine the secondary systems in the overlapping area, or obtain the information of the secondary systems in the overlapping area from the spectrum coordinator.

In addition, more generally, the secondary systems in the overlapping area may further refer to a set of secondary systems of which mutual interferences exceed a predetermined degree when the secondary systems respectively use the same spectrum resources to perform data transmission, among the secondary systems managed by two spectrum coordinators. The set of secondary systems may be determined by the determining unit 101, for example, based on historical information or by estimating the interferences.

After the determining unit 101 determines the secondary systems in the overlapping area, the clustering unit 102 clusters these secondary systems based on relative interferences among the secondary systems and quality of service requirements of the secondary systems, so as to avoid occurring of serious co-channel interferences. In the present disclosure, clustering refers to grouping the secondary systems such that the secondary systems in the same group have relatively small mutual interferences, for example, meeting the quality of service requirements of respective secondary systems, while performing communication by using the same spectrum resources, and different clusters use different spectrum resources. In this way, the utilization efficiency of the spectrum resources may be increased while meeting the quality of service requirements of respective secondary systems.

In an example, the clustering unit 102 is configured to perform clustering based on a degree of relative interferences among the secondary systems relative to the quality of service requirements of the secondary systems. The clustering unit 102 may calculate the degree of relative interferences between each pair of secondary systems, and perform clustering based on the degree of relative interferences. In an example, the clustering unit 102 may select a secondary system having the highest quality of service requirement (or highest priority level) as a first member of a cluster; and select a secondary system which has the lowest relative interferences with existing members in the cluster as a new member to be added in the cluster under the condition of satisfying the quality of service requirement of each member in the cluster after the adding. When adding the first member of the cluster, if there are multiple secondary systems having the same quality of service requirement, a secondary system which is subjected to the most serious interferences from other secondary systems is preferentially selected.

Specifically, for example, the clustering unit 102 may build an undirected weighted graph formed by the secondary systems. A weight of an edge of the undirected weighted graph is based the degree of relative interferences.

Figure 3:
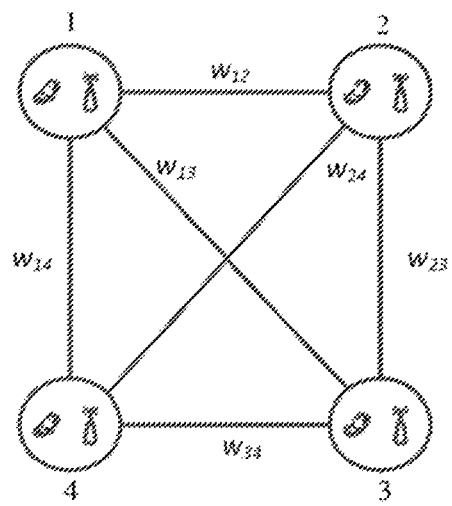
FIG. 3 shows an example of an undirected weighted graph built with four secondary systems as an example.

The undirected weighted graph may be represented as G=(V E, W), where V represents a set formed by limited secondary systems, E represents a set of edges between the secondary systems, and W represents a set of weights of all edges. For ease of understanding, FIG. 3 shows an example of the undirected weighted graph built with four secondary systems as an example. Four secondary systems serve as vertices and are indicated by numbers 1, 2, 3 and 4 respectively. An edge connects two vertices, $w_{ij}$ marked on the edge indicated a weight, and subscripts of $w_{ij}$ respectively indicate numbers of the two vertices of the edge.

The weight $w_{ij}$ takes both the relative interferences between the secondary systems and the quality of service requirements of the secondary systems into consideration. In other words, the weight $w_{ij}$ is obtained based on a degree of relative interferences between a secondary system i and a secondary system j relative to the quality of service requirements of the secondary systems.

In an example, the quality of service may be represented by the signal to interference plus noise ratio (SINR). The quality of service requirement may, for example, be represented by a threshold of the signal to interference plus noise ratio (SINR). In this example, the weight $w_{ij}$ may be defined by the following formula (1):

$$w_{ij} = \frac{P_{maxi}d_{ii}^{-\alpha_{ii}}}{P_{maxj}d^{-\alpha jj}SINR_{thi}} + \frac{P_{maxj}d_{jj}^{-\alpha jj}}{P_{maxi}d_{ji}^{-\alpha ji}SINR_{thj}} \quad (1)$$

In the formula, $w_{ij}$ represents the weight between the i-th secondary system and the j-th secondary system; $P_{maxi}$ and $P_{maxj}$ respectively represent maximum emitting power in the i-th secondary system and maximum emitting power in the j-th secondary system; $d_{ii}$ and $d_{ij}$ respectively represent a distance between a transmitter and a receiver in the i-th secondary system and a distance between a transmitter and a receiver in the j-th secondary system; $a_{ii}$ and $a_{jj}$ respectively represent a path loss index between the transmitter and the receiver in the i-th secondary system and a path loss index between the transmitter and the receiver in the j-th secondary system; $d_{ij}$ represents a distance between the transmitter of the j-th secondary system and the receiver of the i-th secondary system; $a_{ij}$ represents a path loss index between the transmitter of the j-th secondary system and the receiver of the i-th secondary system; $SINR_{thi}$ and $SINR_{thj}$ respectively represent the signal to interference plus noise ratio (SINR) threshold of the receiver in the i-th secondary system and a signal to interference plus noise ratio (SINR) threshold of the receiver in the j-th secondary system; $d_{ji}$ represents a distance between the transmitter of the i-th secondary system and the receiver of the j-th secondary system; and $a_{ji}$ represents a path loss index between the transmitter of the i-th secondary system and the receiver of the j-th secondary system.

The clustering unit 102 may respectively calculate the weight of each edge, and perform clustering based on the weight. For example, as described above, the clustering unit 102 may select a secondary system having the highest quality of service requirement as a first member of a cluster; and select a secondary system the sum of the weights of the edges between which and existing members in the cluster is largest as a new member to be added in the cluster, under the condition of satisfying the quality of service requirement of each member in the cluster after the adding.

In adding the first cluster member, if there are multiple secondary systems having the same quality of service requirement, a secondary system which has the smallest sum of the weight of all edges connected to the secondary system is preferentially selected. For example, in a case that the weight of the above formula (1) is used, it is equivalent to selecting a secondary system with relatively the worst performance. Adding a new cluster member as described above means that a secondary system which has the lowest relative interferences with existing members in the cluster will be selected. It should be understood that, the method using the undirected weighted graph described above is only an example of method used by the clustering unit 102, and the clustering unit 102 may perform clustering by using other methods, which are not limited.

If each secondary system in the cluster cannot meet the quality of service requirement thereof after a new cluster member is added, it is indicated that the new cluster member cannot be added into the cluster. Accordingly, the clustering unit 102 can be further configured to create a new cluster if there is a secondary system which cannot be added to existing clusters, in the case that the number of existing clusters does not reach the number of available channels. The number of available channels represents the amount of spectrum resources which can be simultaneously utilized in the resource pool.

Figure 4:
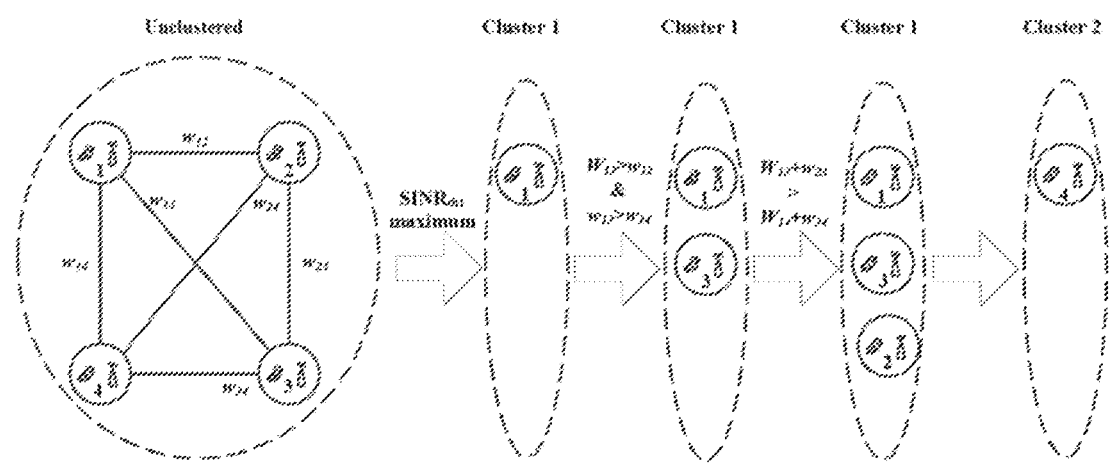
FIG. 4 is a schematic diagram showing a process of clustering the secondary systems 1 to 4 as shown in FIG. 3.

For ease of understanding, FIG. 4 shows a schematic diagram illustrating a process of clustering the secondary systems 1-4 shown in FIG. 3. When creating a new cluster, SINR thresholds of the secondary systems 1-4 are compared firstly. It is assumed that the SINR threshold of the secondary system 1 is the highest, and the secondary system 1 is added as a first member of cluster 1. Subsequently, weights of edges between remaining secondary systems and the secondary system 1 are calculated. For the secondary systems 2, 3, and 4, the weights are respectively represented by $w_{12}$, $w_{13}$ and $w_{14}$. Assuming $w_{13}$ value is the largest, the secondary system 3 is selected to be added into the cluster 1, and SINR value of each member in the cluster at this point is calculated. If SINR values of all members are greater than their respective SINR thresholds, it is indicated that the secondary system 3 can be added into the cluster 1. Otherwise, a new cluster is created in the case that the number of the clusters does not exceed the number of available channels.

Subsequently, in the same way, sums of the weights of edges between other secondary systems (that is, the secondary systems 2 and 4) and the secondary systems 1 and 3 are respectively calculated, which are respectively represented by $w_{12}+w_{23}$ and $w_{14}+w_{34}$. Assuming $w_{12}+w_{23}>w_{14}+w_{34}$, the secondary system 2 is selected to be added to the cluster 1, and the SINR value of each member in the cluster 1 is calculated at this time. If SINR values of all members are greater than their respective SINR thresholds, it is indicated that the secondary system 2 can be added to the cluster 1. Otherwise, a new cluster is created in a case that the number of the clusters does not exceed the number of available channels.

Finally, it is attempted to add the secondary system 4 into the cluster 1. If there is a secondary system in the cluster 1 of which SINR is lower than its SINR threshold, the secondary system 4 cannot be added to the cluster 1 and is removed from the cluster 1. If the number of available channels is greater than 1, a new cluster is created to accommodate the secondary system 4.

Figure 5:
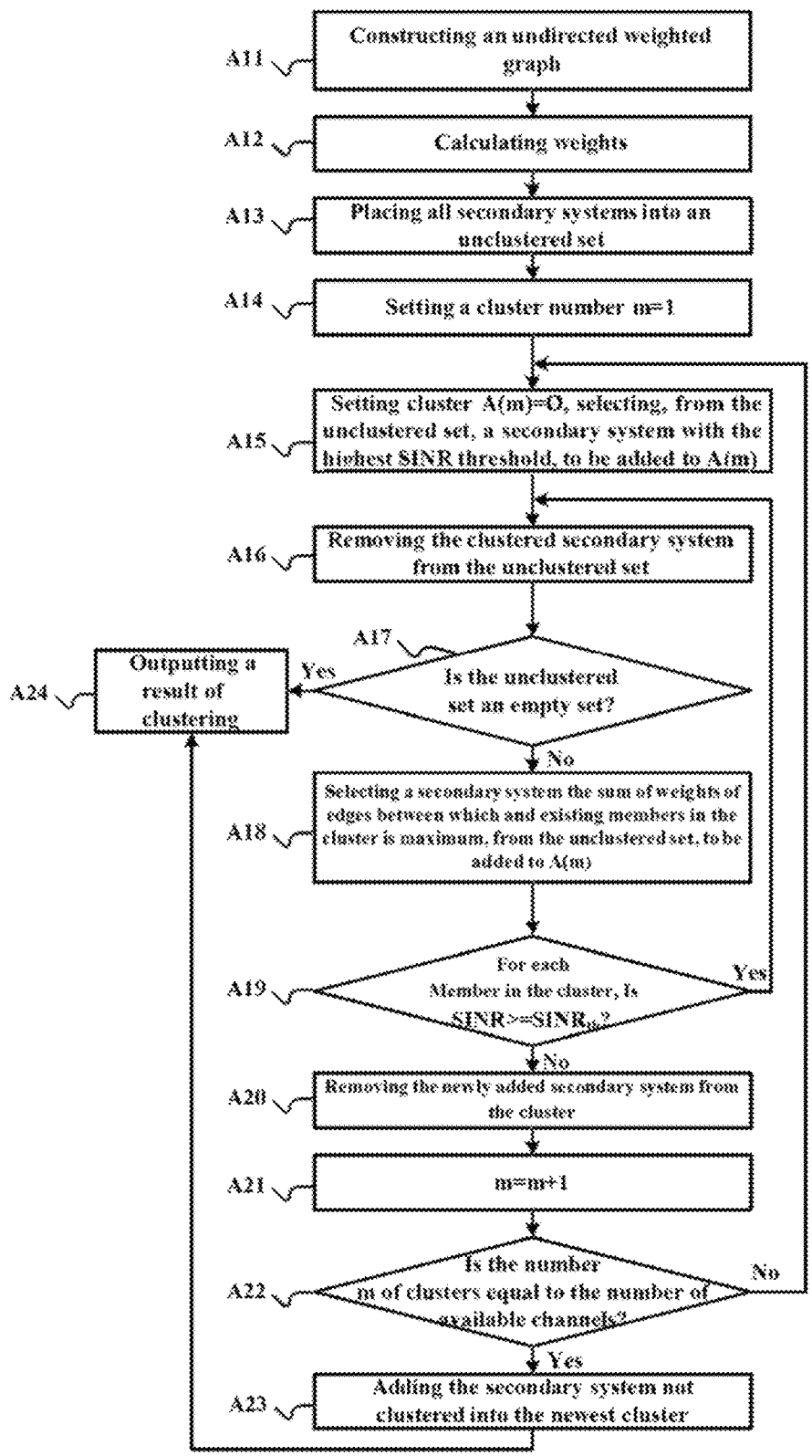
FIG. 5 shows a specific example of a flowchart of the clustering operation.

In order to fully describe operations performed of the clustering unit 102, FIG. 5 shows a specific example of a flowchart of the clustering operation. It should be understood that, FIG. 5 is only illustrative rather than restrictive, and operations performed by the clustering unit 102 are not limited thereto.

For example, in step A11, an undirected weighted graph is built. In step A12, weights of all edges in the undirected weighted graph are calculated, and for convenience, the weights may be sorted according to a descending order. In step A13, all secondary systems are placed into an unclustered set. Starting from step A14, clustering is performed according to the method shown in FIG. 4. In step A14, an initial value of a number m of the cluster is set to 1. In step A15, the cluster A(m) is initialized to an empty set, and from the unclustered set, a secondary system with the highest SINR threshold is selected to be added into the cluster A(m). Subsequently, in step A16, the secondary system added into the cluster A(m) is removed from the unclustered set. In step A17, it is determined whether the unclustered set is an empty set; if the unclustered set is an empty set, it is indicated that the clustering ends, the processing proceeds to step A24, and a clustering result is output. Otherwise, the processing proceeds to step A18, a secondary system, the sum of weights of edges between which and existing members in the cluster A(m) is the largest, is selected from among the unclustered set to be added into the cluster A(m). In step A19, for each member in the cluster, it is determined whether its SINR requirement is met, that is, determining whether SINR is higher than its threshold. If SINR is higher than its threshold, it is indicated that the secondary system added in step A18 can be added into the cluster, and the processing returns to step A16 to continue the operation of adding a new cluster member. Otherwise, if there is a secondary system in the cluster of which SINR is lower than its threshold, it is indicated the secondary system added in step A18 cannot be added into the cluster, and the processing proceeds to step A20 to remove the newly added secondary system from the cluster. Since it is required to create a new cluster at this time, in step A21, 1 is added to the number m of the cluster, and in step A22, it is determined whether the number of clusters is equal to the number of available channels. If it is determined in step A22 that the number of clusters is equal to the number of available channels, it is indicated that the cluster is the last cluster, and in step A23, all secondary systems in the unclustered set are added into the new cluster, the processing proceeds to step A24. Otherwise, if it is determined in step A22 that the number of clusters is not equal to the number of available channels, the processing returns to step A15 and clustering continues.

It should be noted that, in the determination of step A19, it may be further determined whether the difference between the SINR value and the SINR threshold is greater than a preset value rather than 0. The preset value may be set based on the number of secondary systems in the overlapping area and the amount of available resources.

It may be seen that, during the above process of clustering the secondary systems in the overlapping area, two aspects of the relative interferences among the secondary systems and the quality of service requirements of the secondary systems are considered, so as to meet the quality of service requirements of the secondary systems while avoiding the serious co-channel interferences among the secondary systems, improving the utilization efficiency of the spectrum.

In addition, it should be understood that, although the clustering for the secondary systems in the overlapping area is described above, the above clustering method may be applied to clustering of the secondary systems managed by single spectrum coordinator, which is not restrictive.

In an example, the above operations performed by the determining unit 101 and the clustering unit 102 may be performed in response to event indication information indicating one or more of the following events: network topology in the particular area changes, quality of service of a secondary system in the particular area decreases. However, the types of the event indication information are not limited thereto, and may include any information indicating occurrence of a situation where clustering may be required. Alternatively, the above operations performed by the determining unit 101 and the clustering unit 102 may also be performed periodically. Schematically, the occurrence of these events may be detected by the secondary systems, and may be provided to the electronic apparatus 100 via the spectrum coordinator to which the secondary systems belong, for example.

Second Embodiment

Figure 6:
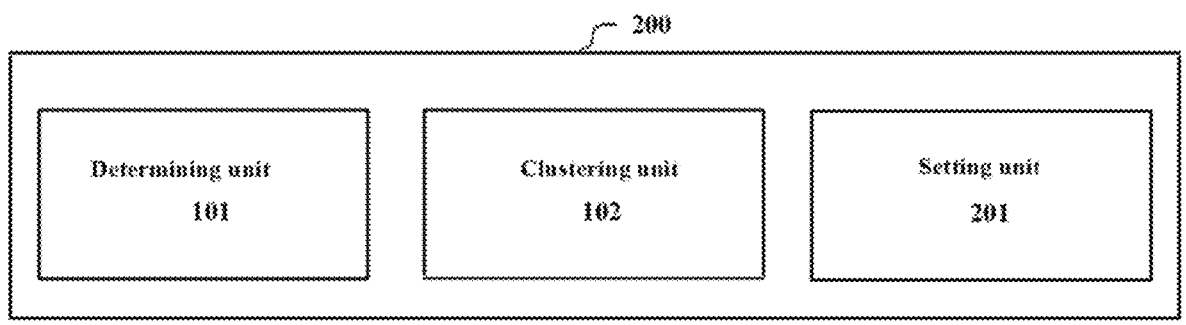
FIG. 6 is a block diagram showing functional modules of an electronic apparatus according to another embodiment of the present disclosure.

FIG. 6 shows a block diagram of functional modules of an electronic apparatus 200 according to another embodiment of the present disclosure. In addition to respective units shown in FIG. 2, the electronic apparatus 200 further includes a setting unit 201, configured to set a quality of service margin threshold for each cluster, so that each secondary system adjusts its emitting power according to the quality of service margin threshold. The quality of service may, for example, be represented by SINR.

The quality of service margin threshold limits the maximum value by which the quality of service of the secondary systems may exceed the quality of service requirement thereof. The reason is that, if the secondary system has too high quality of service relative to its quality of service requirement, it means that there is unnecessary power waste. Therefore, power waste may be restricted by setting the quality of service margin threshold, so as to further reduce the co-channel interferences between the secondary systems.

In a case that the quality of service is represented by SINR, the setting unit 201 may calculate SINR of each secondary system according to the following formula, and thus set the desirable SINR threshold for each cluster.

$$\text{SINR}_i = 10 \lg \left( \frac{P_{maxi} d_{ii}^{-\alpha_{ii}}}{\sum_{j \in A} P_{maxj} d_{ij}^{-\alpha_{ij}} + N_0} \right) \quad (2)$$

In which, $\text{SINR}_i$ represents SINR of a receiver in the i-th secondary system (also referred to as SINR of the i-th secondary system); A represents a set of other secondary systems belonging to the same cluster with the i-th secondary system; $P_{maxi}$ and $P_{maxj}$ respectively represent maximum emitting power of a transmitter in the i-th secondary system and in the j-th secondary system; $d_{ii}$ represents a distance between the transmitter and the receiver in the i-th secondary system; $a_{ii}$ represents a path loss index between the transmitter and the receiver in the i-th secondary system; $d_{ij}$ represents a distance between the transmitter of the j-th secondary system and the receiver of the i-th secondary system; $a_{ij}$ represents a path loss index between the transmitter of the j-th secondary system and the receiver of the i-th secondary system; $N_o$ represents noise power. It can be seen that, a value of the SINR margin threshold primarily depends on the member information of each cluster such as location information, maximum emitting power and SINR requirement.

The same cluster may be provided with the same quality of service margin threshold, and different clusters may be provided with different quality of service margin thresholds. For example, a range of the value of the quality of service margin threshold is greater than or equal to zero. The value of quality of service margin threshold may be set by using many methods. For example, the quality of service margin threshold of a certain cluster may be set as follows: from among the quality of service thresholds of respective members in the cluster which is greater than zero, the minimum quality of service margin is selected as the quality of service margin threshold of the cluster. Alternatively, in order to save energy resources, the quality of service margin threshold of each cluster may be directly set to 0 (in a case of SINR margin threshold, the value is 0 dB), i.e., not setting any margin.

A secondary system in the cluster may adjust the emitting power of the secondary system according to the quality of service margin threshold set for the cluster the secondary system belongs to. The goal of the power adjustment is to cause the quality of service margin threshold of the secondary system not to exceed the quality of service margin threshold of the cluster the secondary system belongs to. For example, if a quality of service margin of a certain secondary system is greater than the quality of service margin threshold of the cluster, the emitting power is decreased until the quality of service margin is equal to the quality of service margin threshold of the cluster; otherwise, the emitting power remains unchanged. After the power adjustment completes, the secondary system may further report the current emitting power to the spectrum coordinator.

The electronic apparatus 200 according to the embodiment can further reduce co-channel interferences among the secondary systems by setting the quality of service margin threshold for each cluster.

Third Embodiment

Figure 7:
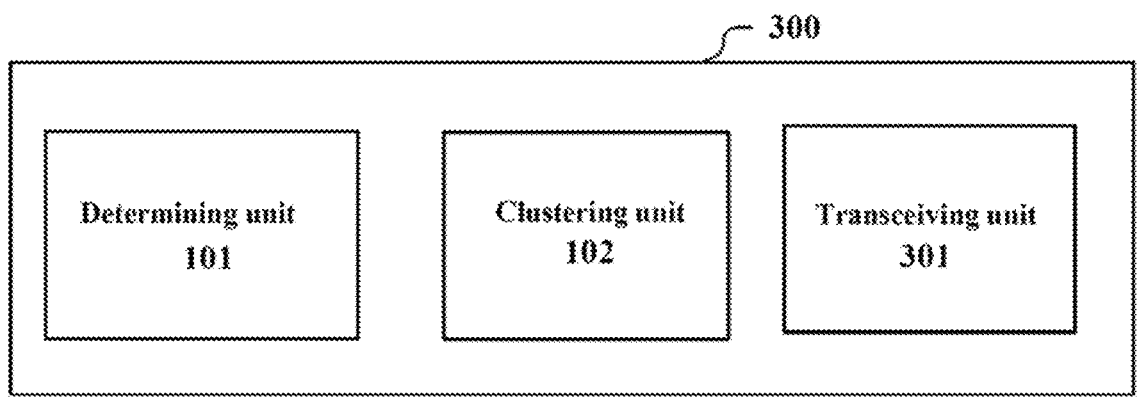
FIG. 7 is a block diagram showing functional modules of an electronic apparatus according to another embodiment of the present disclosure.

FIG. 7 shows a block diagram of functional modules of an electronic apparatus 300 according to an embodiment of the present disclosure. In an example, the particular area is an overlapping area of areas managed by multiple spectrum coordinators. In addition to respective units shown in FIG. 2, the electronic apparatus 300 further includes a transceiving unit 301, configured to receive, from the multiple spectrum coordinators, information about at least one of the following of the secondary systems managed by the multiple spectrum coordinators: geographical location information, quality of service requirement and maximum emitting power. As described above, the information may be used for clustering and setting a quality of service margin threshold. It should be understood that, although not shown in figure, the electronic apparatus 300 may further include the setting unit 201 described in the second embodiment.

In an example, the electronic apparatus 300 may be located in a public spectrum coordinator controlling multiple spectrum coordinators, or may be connected to the public spectrum coordinator.

In the example, the transceiving unit 301 is further configured to receive from the spectrum coordinator the event indication information indicating one or more of the following events: network topology in the overlapping area changes, and quality of service of a secondary system in the overlapping area decreases. As described above, the occurrence of these events indicates that serious co-channel interference may occur, and therefore the secondary systems in the overlapping area are required to be collectively clustered. The spectrum coordinator receives, from the secondary systems managed by the spectrum coordinator, indication of the occurrence of these events, and triggers to transmit the event indication information to the electronic apparatus 300. In addition, the spectrum coordinator may further transmit the event indication information to other spectrum coordinators involved by the overlapping area.

The transceiving unit 301 may further be configured to transmit a result of clustering to multiple spectrum coordinators. The result of clustering, for example, includes identifier information or location information of a secondary system managed by the corresponding spectrum coordinator and information of a cluster identifier of the cluster the secondary system belongs to. There may be a one-to-one correspondence between the cluster identifier and spectrum resources to be allocated to the cluster corresponding to the cluster identifier, so that the spectrum coordinator may allocate spectrum resources to the cluster according to the cluster identifier. In other words, after obtaining the cluster identifier, spectrum resources to be used by the cluster are known.

In the example, it is unnecessary to interchange sensitive user (that is, the secondary system) information between the spectrum coordinators, and it is merely required to report the user information to a public spectrum coordinator, thereby being beneficial to system privacy and security. Correspondingly, the public spectrum coordinator merely notifies a spectrum coordinator of the result of clustering of the secondary systems managed by the spectrum coordinator.

Further, the transceiving unit 301 is further configured to transmit a quality of service margin threshold set for each cluster to respective spectrum coordinators. In this way, the respective spectrum coordinators may transmit to a secondary system managed by the spectrum coordinator the quality of service margin threshold corresponding to the secondary system, so that the secondary system properly adjusts its emitting power according to the quality of service margin threshold.

Figure 8:
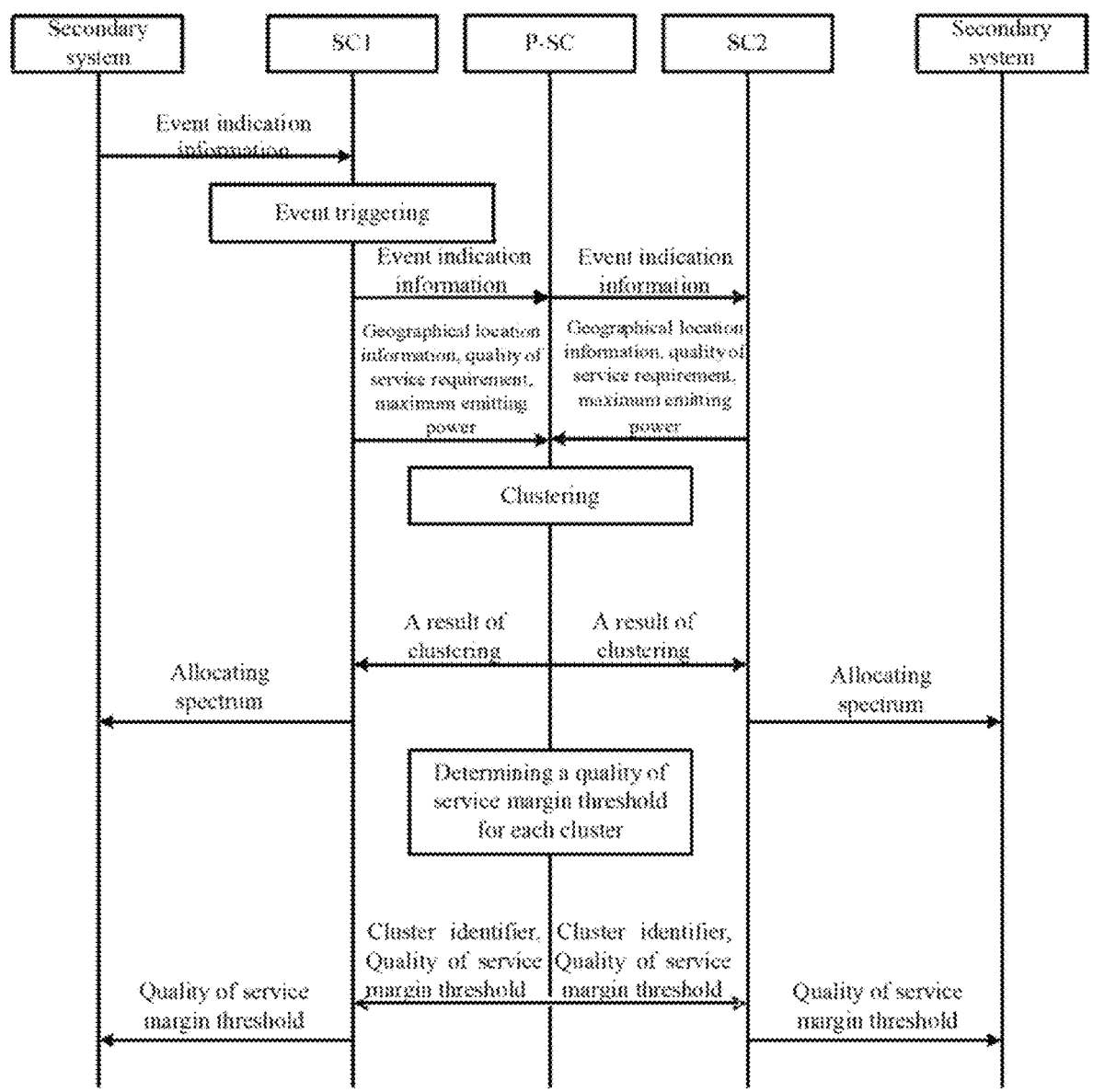
FIG. 8 shows an example of the information procedure.

For ease of understanding, FIG. 8 shows an example of information procedure for performing information interchanging among a public spectrum coordinator, spectrum coordinators and secondary systems. It should be understood that, the information procedure is only illustrative rather than restrictive. The public spectrum coordinator (P-SC) may include any one of the electronic apparatus 100 to 300 described above or implement at least a part of functions of the electronic apparatus 100 to 300. It should be understood that, FIG. 8 respectively shows an example of SC1 and SC2 acting as spectrum coordinators managed by P-SC, which is not restrictive. The number of spectrum coordinators managed by P-SC may be more.

Firstly, it is assumed that a certain secondary system managed by SC1 detects, for example, the event of network topology changing or quality of service decreasing, and the secondary system transmits the corresponding event indication information to SC1. After receiving the event indication information, SC1 triggers event and generates the corresponding event indication information, and transmits the event indication information to the P-SC and other spectrum coordinators in the overlapping area. The relevant spectrum coordinators report location information, quality of service requirement and maximum emitting power of the secondary systems in the overlapping area managed by the spectrum coordinators to the P-SC. The overlapping area may be determined by the P-SC according to global geographical location information and informed to respective spectrum coordinators, and may also be determined by the spectrum coordinators themselves by interchanging the management area information with each other. P-SC performs clustering according to the information reported by the spectrum coordinators, subsequently, informs the result of clustering, such as the identifier or location information of the secondary system and the identifier of the cluster the secondary system belongs to, to the relevant spectrum coordinators. The respective spectrum coordinators perform spectrum allocation based on the obtained cluster information, and inform the allocated spectrum to the secondary systems.

In addition, optionally, P-SC may further determine a quality of service margin threshold of each cluster (such as SINR margin threshold), and transmit the corresponding quality of service margin threshold of each cluster to the spectrum coordinators. The spectrum coordinators notifies the respective secondary systems of the corresponding quality of service margin threshold based on the clustering information and the quality of service margin threshold information corresponding to each cluster. In this way, the secondary system adjusts its emitting power according to the quality of service margin threshold, so that the quality of service margin does not exceed the quality of service margin threshold.

Although the case where the electronic apparatus 300 is located in the public spectrum coordinator or is connected to the public spectrum coordinator is described above, the electronic apparatus 300 may be located in the spectrum coordinator in a case that there is no public spectrum coordinator. For example, SC1 performs the operations which are performed by P-SC in FIG. 8, in which case, the involved information is directly interchanged between SC1 and SC2. Specifically, the transceiving unit 301 receives, from other spectrum coordinators, information about at least one of the following of the secondary systems managed by other spectrum coordinators: geographical location information, quality of service requirement and maximum emitting power. The determining unit 101 determines the secondary systems in the overlapping area based on the received information and the corresponding information of the secondary systems managed by the present spectrum coordinator. The clustering unit 102 performs clustering based on the relative interferences among the secondary systems and quality of service requirements of the secondary systems. After the clustering completes, the transceiving unit 301 transmits the result of clustering to the corresponding spectrum coordinators. In addition, similarly, the setting unit 201 may perform the operations of setting the quality of service margin threshold for each cluster. Related details are described in detail above, which are not repeated here.

In addition, in the actual network, multiple spectrum coordinators may be further managed by different public spectrum coordinators, and respective public spectrum coordinators perform clustering respectively inside the management areas, instead of collectively clustering. In this case, in order to avoid co-channel interferences between the secondary systems in the overlapping area, it is required to interchange the relative information of the secondary systems located in an overlapping area between public spectrum coordinators. The overlapping area here is an overlapping area of management regions of two public spectrum coordinators. The overlapping area may be determined by public spectrum coordinators according to geographical location information by interchanging the information of management regions with each other. Public spectrum coordinators, for example, may inform their own management regions with each other by broadcasting.

Correspondingly, the transceiving unit 301 is further configured to receive, from the multiple spectrum coordinators, emitting power of a secondary system located in the overlapping area with another public spectrum coordinator and which is managed by the multiple spectrum coordinators, and interchange a result of clustering and the emitting power with another public spectrum coordinator, so as to avoid co-channel interferences.

For example, a public spectrum coordinator 1 completes clustering, and transmits a result of clustering and related emitting power to a public spectrum coordinator 2. The public spectrum coordinator 2 performs spectrum allocation based on the above information provided by the public spectrum coordinator 1 after the clustering, so as to avoid serious co-channel interferences. For example, if inter-cluster interferences between a cluster in the public spectrum coordinator 2 and a cluster in the public spectrum coordinator 1 cannot meet quality of service requirements of secondary systems, the cluster in the public spectrum coordinator 2 is required to use spectrum different from that of the corresponding cluster in the public spectrum coordinator 1. Subsequently, the public spectrum coordinator 2 transmits this information to the corresponding spectrum coordinators, and may notify the public spectrum coordinator 1 of the following information: information of the result of clustering of users located in the overlapping area within the management region (such as, the identifier information or location information of the secondary system, the identifier of the cluster the secondary system belongs to), emitting power and so on.

Figure 9:
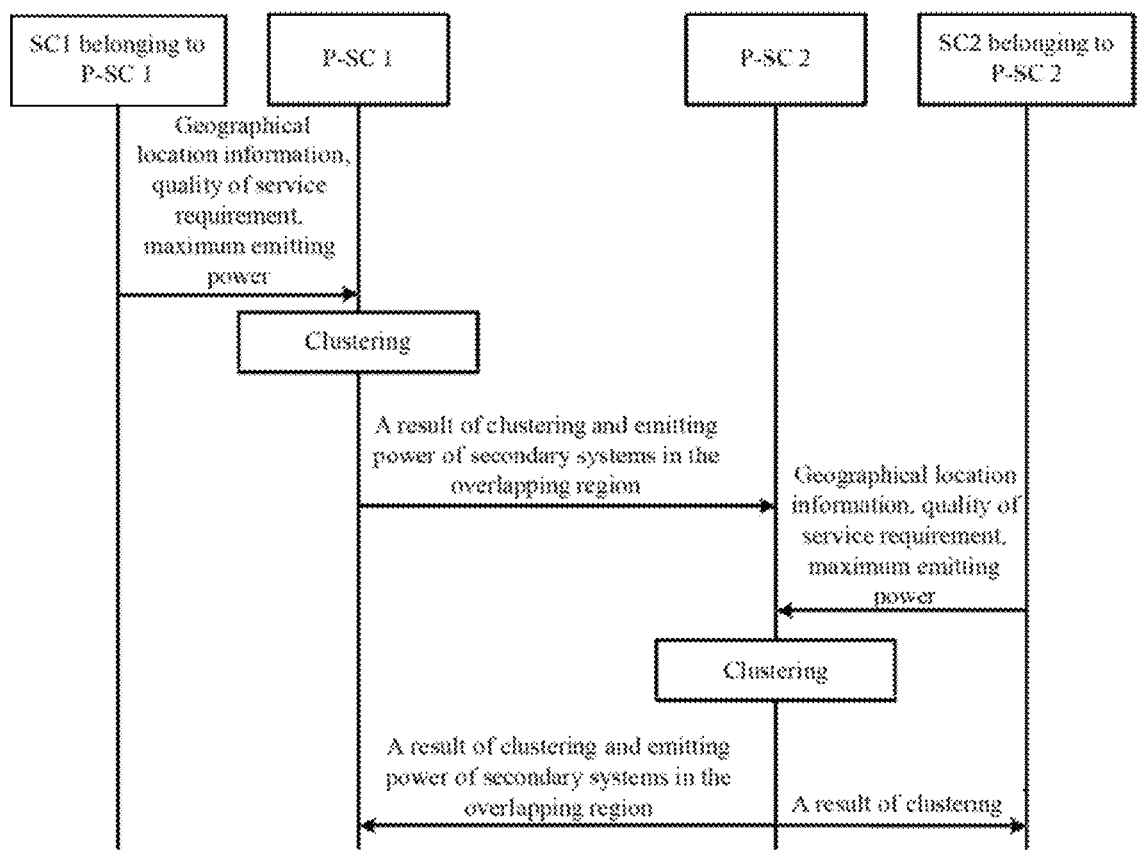
FIG. 9 shows another example of the information procedure.

For ease of understanding, FIG. 9 shows an example of information procedure of cooperation between public spectrum coordinators. It should be understood that, the information procedure is only illustrative rather than restrictive. The public spectrum coordinator (P-SC) may include any one of the electronic apparatus 100 to 300 described above or implement at least a part of functions of the electronic apparatus 100 to 300. It should be understood that, FIG. 9 respectively shows SC1 and SC2 as an example of spectrum coordinators managed by P-SC 1 and P-SC 2. Actually, the number of spectrum coordinators managed by P-SC 1 and P-SC 2 may be more. Moreover, the number of public spectrum coordinators which cooperate with each other is not limited to two as shown in FIG. 9 either.

As shown in FIG. 9, SC1 transmits the following information to its corresponding public spectrum coordinator P-SC1: geographical location information, quality of service requirement (such as SINR threshold) and maximum emitting power of the secondary systems managed by SC1. P-SC 1 performs clustering on the secondary systems located in the overlapping area of areas managed by multiple spectrum coordinators based on this information. After the clustering completes, P-SC1 transmits the related clustering information and emitting power of the secondary systems located in the overlapping area of areas managed by P-SC 1 and P-SC 2 to P-SC 2. When P-SC 2 performs clustering based on the received geographical location information, quality of service requirement (such as SINR threshold) and maximum emitting power of the secondary systems managed by P-SC 2, the above information provided by P-SC 1 is required to be taken into consideration, so as to avoid occurrence of serious co-channel interferences between the secondary systems located in the overlapping area of P-SC 1 and P-SC 2. Finally, P-SC 2 transmits the result of clustering to the secondary system managed by P-SC 2, and transmits the related clustering information and emitting power of the secondary system located in the overlapping area to P-SC 1. It should be noted that, the emitting power of the secondary system which is interchanged between P-SC 1 and P-SC 2 may be set as maximum emitting power by default, or may be the emitting power after power adjustment on the basis of SINR margin threshold. In the latter case, as described above, the secondary system is required to report the information of the adjusted emitting power to the spectrum coordinator to which the secondary system belongs, and the spectrum coordinator reports the information to the corresponding public spectrum coordinator.

In another example, the electronic apparatus 300 may be located in a spectrum coordinator, or may be connected to the spectrum coordinator.

In the example, the particular area is at least a part of an area managed by a spectrum coordinator. The transceiving unit 301 may be configured to receive information about at least one of the following of the secondary systems managed by the one spectrum coordinator: geographical location information, quality of service requirement and maximum emitting power. Correspondingly, the clustering technology and the power adjustment technology described in the first embodiment and the second embodiment are still applicable, which are not repeated here.

For example, the electronic apparatus 300 may be further configured to allocate spectrum resources in unit of cluster based on a result of the clustering. As described above, in a case that there is one-to-one correspondence between the cluster identifier and spectrum resources, spectrum resources may be allocated in accordance with numbers of the clusters.

In addition, the transceiving unit 301 may be further configured to transmit a quality of service margin threshold to the secondary systems, so that each secondary system adjusts its emitting power according to the quality of service margin threshold.

Figure 10:
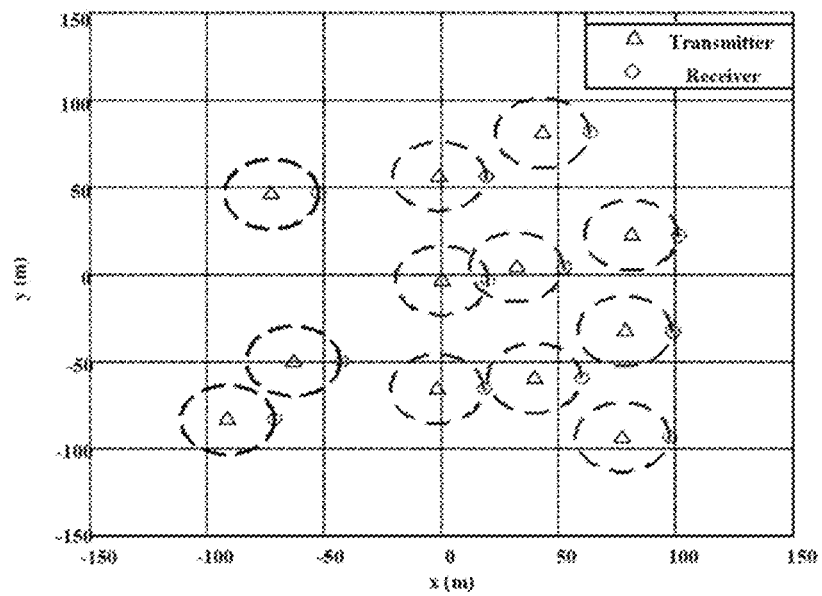
FIG. 10 shows a schematic diagram of a simulation scenario.

Improvement of system performance produced by the clustering technology and power adjustment technology of the present disclosure is shown below through a simulation example. FIG. 10 shows a schematic diagram of a simulating scenario. Multiple secondary systems share a same spectrum pool, and secondary systems in an overlapping area are controlled by different spectrum coordinators. In a given time interval, only one pair of users communicate in each secondary system. A transmitter is located at a center of the secondary system, and a receiver is located at an edge of the secondary system. Different transmitters are distributed in an area of 100 meters multiplied by 100 meters randomly. A service radius of each secondary system is 20 meters, and only large-scale path loss is considered.

Simulation parameters are set as follows. The number of secondary systems $N_p$ is 12, the number of available channels $N_c$ is 3, noise figure (NT) at receivers is 5 dB, SINR thresholds ($SINR_{th}$) of 12 secondary systems are 9 dB to 20 dB at an interval of 1 dB, maximum emitting power of the first 6 secondary systems ($P_{max1}$) is 3 dBm, maximum emitting power of the last 6 secondary systems ($P_{max2}$) is 0 dBm, a path loss index between the transmitter and receiver in each secondary system is 2.5, a path loss index between a transmitter of the j-th secondary system and a receiver of the i-th secondary system is 3.5, SINR margin threshold of each cluster ($\Delta C_i$) is all 0 dB.

In the simulation, the locations of the 12 secondary systems are changed, and 10000 times of cyclic simulations are performed. The performance for the following four methods is compared: 1) a traditional sequential coloring method; 2) the method described in the first embodiment, however, when the clustering is performed based on an undirected weighted graph, a SINR threshold is not considered for calculating a weight of an edge, that is, the weight is calculated as $$w_{ij} = \frac{P_{maxi}d_{ii}^{-\alpha_{ii}}}{P_{maxj}d_{ij}^{-\alpha_{ij}}} + \frac{P_{maxj}d_{jj}^{-\alpha_{jj}}}{P_{maxi}d_{ji}^{-\alpha_{ji}}},$$

and the definition of each symbol is identical to those of the formula (1); 3) the method described in first embodiment; and 4) the method described in the second embodiment, that is, power adjustment is further performed.

The probabilities of meeting quality of service requirements of all secondary systems obtained by using the above four methods are respectively 82%, 84%, 95% and 96%. It can be seen that, the technology of the present disclosure can better guarantee the quality of service of the secondary systems, increase the number of secondary systems which meet the quality of service requirements as well as the probability of meeting the quality of service requirements of all users.

Figure 11:
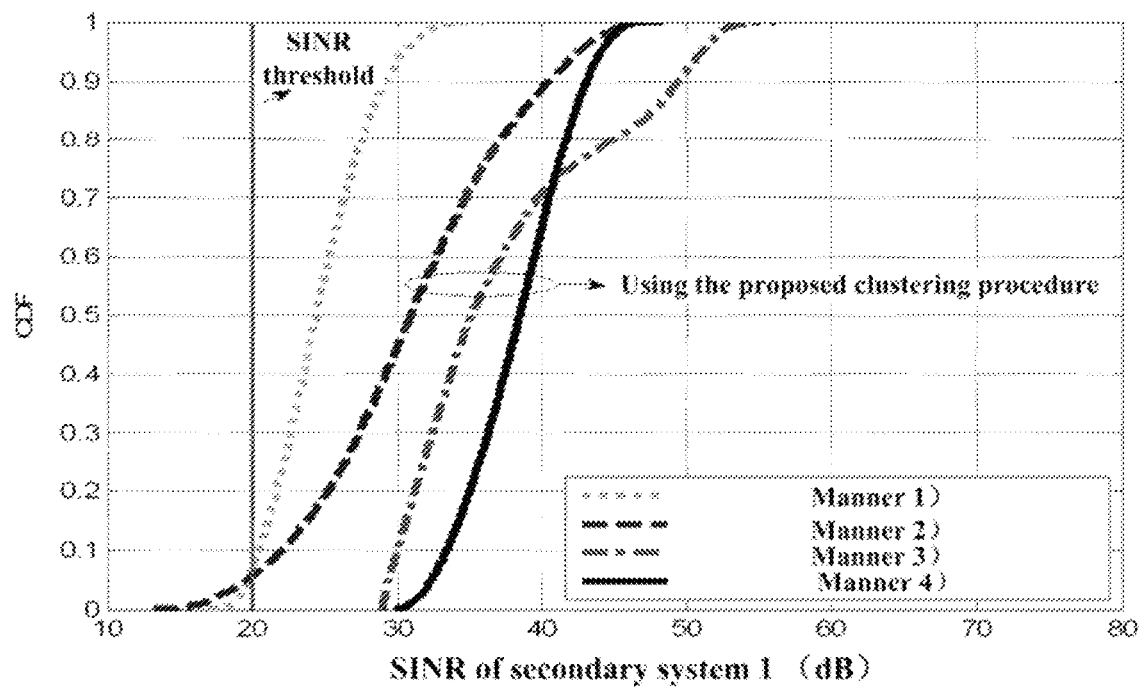
FIG. 11 shows a graph of a simulation result.

FIG. 11 shows a schematic diagram of cumulative distribution function (CDF) of SINR of the secondary system 1 as an example. The probabilities of failing to meet the quality of service requirement of the secondary system when using the methods 1) and 2) are both 6%, and the probabilities of failing to meet the quality of service requirement of the secondary system when using the methods 3) and 4) are 0%. Therefore, it can be seen that, the weight calculation method in the present disclosure can better meet different SINR requirements of different secondary systems.

Figure 12:
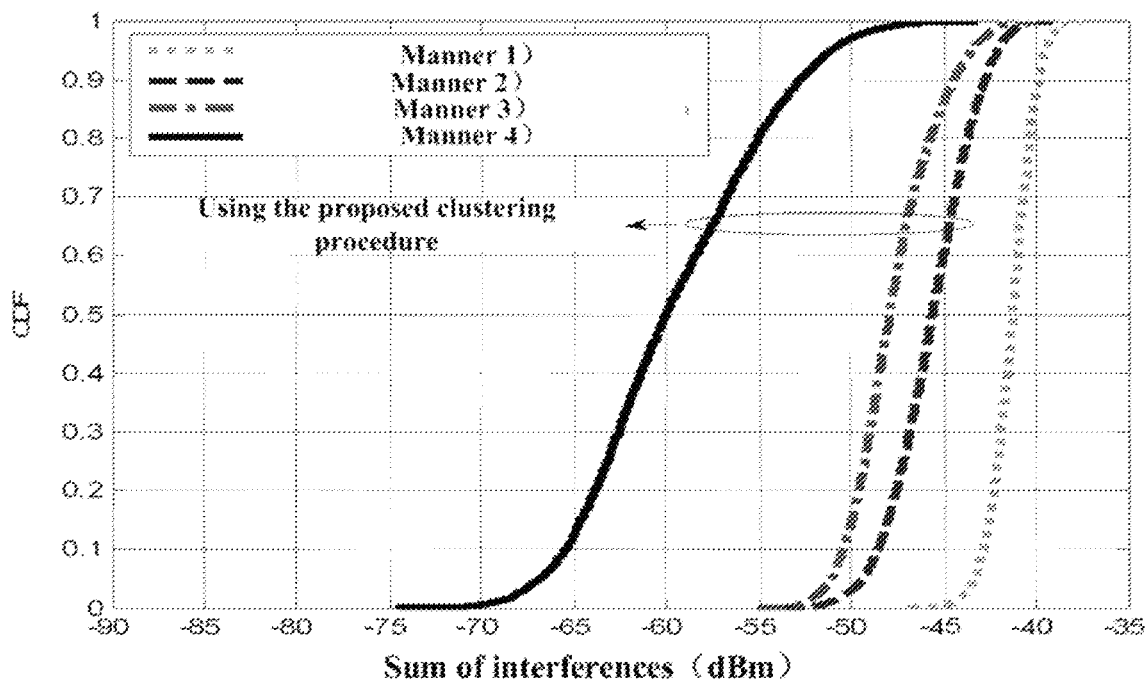
FIG. 12 shows another graph of the simulation result.

FIG. 12 shows a cumulative distribution diagram of sum of interferences in the overlapping area. The sum of interferences represents a summation of interferences among the secondary systems within a cluster for all clusters. The mathematical formula is represented as follows:

$$I_{sum} = \sum_{m=1}^{Nc} \sum_{j \in C_m} P_j d_{ij}^{-\alpha_{ij}} \qquad (3)$$

$C_m$ represents the m-th cluster; $N_c$ represents the sum of clusters (equal to the number of available channels); $P_1$ represents emitting power of a transmitter in the j-th secondary system; $d_{ij}$ represents a distance between the transmitter in the j-th secondary system and a receiver in the i-th secondary system; $a_{ij}$ represents a path loss index between the transmitter in the j-th secondary system and the receiver in the i-th secondary system. As can be known from FIG. 12, the weight calculation method in the present disclosure may reduce sum of interferences of the secondary systems, and may further reduce sum of interferences of the secondary systems after performing power adjustment.

Fourth Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the apparatus can also be used in the methods.

Figure 13:
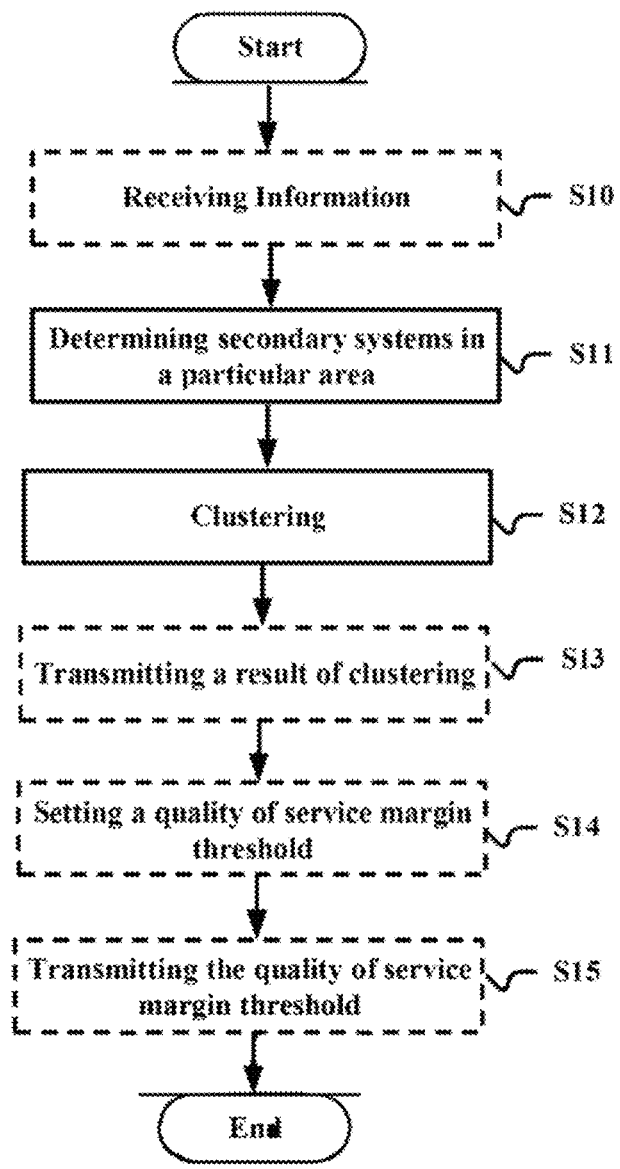
FIG. 13 shows a flowchart of a method for an electronic apparatus according to an embodiment of the present disclosure.

FIG. 13 shows a flowchart of a method for an electronic apparatus according to an embodiment of the present disclosure. The method includes: determining secondary systems in a particular area (S11); and clustering, based on the relative interferences among the secondary systems and quality of service requirements of the secondary systems, the secondary systems (S12).

In addition, in an example, a particular area is an overlapping area of areas managed by multiple spectrum coordinators. As shown by a dashed line block in the figure, the above method may further include: receiving information about at least one of the following of the secondary systems managed by the spectrum coordinator: geographical location information, quality of service requirement and maximum emitting power (S10); and transmitting a result of clustering to the spectrum coordinator (S13).

The quality of service may be represented by signal to interference plus noise ratio. The result of clustering may include identifier information of the secondary system managed by the corresponding spectrum coordinator and information of cluster identifier of the cluster to which the secondary system belongs.

Before receiving the above information in step S10, the event indication information indicating one or more of the following events may be further received: network topology in the overlapping area changes and quality of service of a secondary system in the overlapping area decreases. The processing in step S11 and step S12 is performed in response to the event indication information.

In an example, a particular area may be determined according to geographical location information in step S11. In step S12, the clustering can be performed based on a degree of relative interferences among the secondary systems relative to the quality of service requirements of the secondary systems. Specifically, for example, an undirected weighted graph formed by the secondary systems may be built, and a weight of an edge of the undirected weighted graph is based on the above degree of relative interferences.

For example, the clustering may be performed as follows: selecting a secondary system with the highest quality of service requirement as a first member of a cluster; selecting a secondary system which has the lowest relative interferences with existing members in the cluster as a new member to be added in the cluster, under the condition of satisfying the quality of service requirement of each member in the cluster after the adding. In a case that the number of the existing clusters does not reach the number of available channels, if there is a secondary system which cannot be added into existing cluster, a new cluster is created.

In addition, as shown by a dashed line block in the figure, the above method may further include step S14: setting a quality of service margin threshold for each cluster, so that each secondary system adjusts its emitting power according to the quality of service margin threshold. In step S15, the quality of service margin threshold set for each cluster may be transmitted to respective spectrum coordinators.

Although not shown in the figure, in a case that multiple spectrum coordinators are controlled by multiple public spectrum coordinators, the above method further include: receiving, from the multiple spectrum coordinators, emitting power of a secondary system located in the overlapping area with another public spectrum coordinator and which is managed by the multiple spectrum coordinators, and interchanging a result of clustering and the emitting power with another public spectrum coordinators, so as to avoid co-channel interferences.

In addition, in the above method, the particular area may also be at least a part of an area managed by a spectrum coordinator. In step S10, the information about at least one of the following of the secondary systems managed by the spectrum coordinator may be further received: geographical location information, quality of service requirement and maximum emitting power. The spectrum resources are allocated in unit of cluster based on a result of clustering after the clustering, for example, spectrum resources are allocated in accordance with numbers of the clusters. In step S15, a quality of service margin threshold may be transmitted to the secondary systems, so that each secondary system adjusts its emitting power according to the quality of service margin threshold.

Note that each of the above methods may be used in combination or separately and the details thereof have been described in detail in the first to third embodiments, which will be not repeated herein.

In conclusion, with the electronic apparatus and the method according to the present disclosure, one or more of the following effects can be achieved: significantly increasing the number of secondary systems which meet the quality of service requirements in the overlapping area; guaranteeing different qualities of service based on different quality of service requirements of different secondary systems; effectively reducing co-channel interferences between the secondary systems in the overlapping area; avoiding to interchange sensitive information between the spectrum coordinators; improving privacy, confidentiality and security of the system; reducing signaling interaction overheads.

Application Example

The technology according to the present disclosure may be applied to various types of products. For example, the electronic apparatus 100 to 300 may be implemented as any type of servers, such as a tower server, a rack server or a blade server. The electronic apparatus 100 to 300 may be control modules installed in the server (such as an integrated circuit module including a single wafer, and a card or blade inserted into a slot of the blade server).

For example, a base station in the above mentioned secondary system may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

For example, user equipment in the secondary systems may be implemented as a mobile terminal (such as a smart phone, a tablet personal computer (PC), a notebook PC, a portable game terminal and a portable/dongle mobile router and a digital camera) or an in-vehicle terminal such as a car navigation apparatus. The UE may be further implemented as a terminal performing machine to machine (M2M) communication (that is also referred to as a machine type communication (MTC) terminal). In addition, the user equipment may be a wireless communication module installed on each of the above terminals (such as an integrated circuit module including a single wafer).

Application Examples Regarding the Electronic Apparatus

Figure 14:
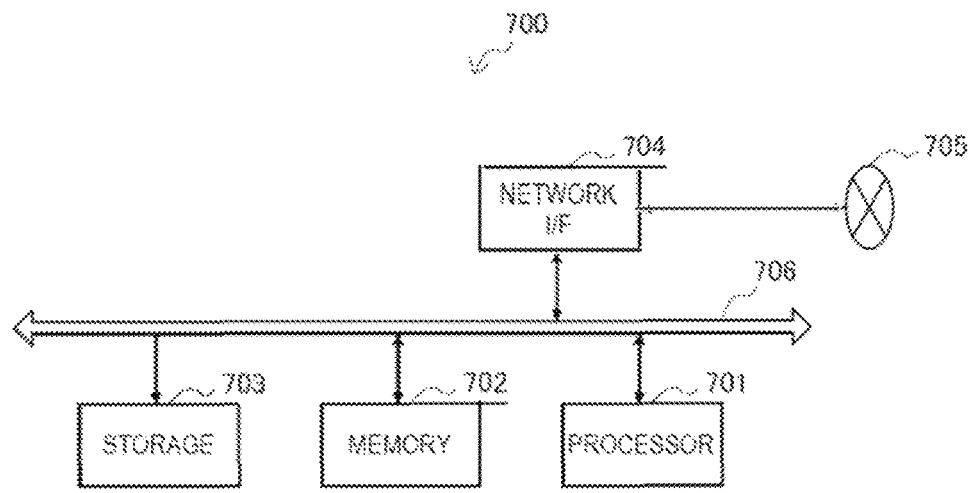
FIG. 14 shows a block diagram illustrating an example of a schematic configuration of a server.

FIG. 14 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 14, the determining unit 101, the clustering unit 102 and the setting unit 201 described with reference to FIG. 2, FIG. 6 and FIG. 7 may be implemented by the processor 701. For example, the processor 701 may perform the clustering operation and the quality of service margin threshold setting operation according to the present disclosure by performing operations of the determining unit 101, the clustering unit 102 and the setting unit 201.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1500 shown in FIG. 15) from a storage medium or network, wherein the computer is capable of implementing various functions when installed with various programs.

Figure 15:
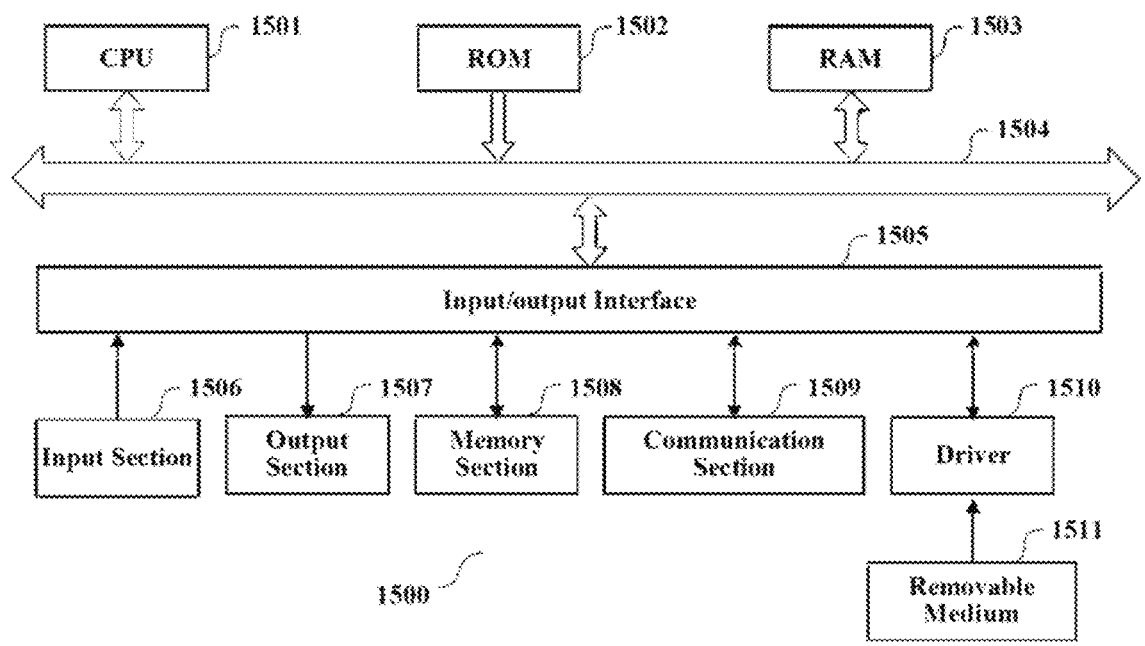
FIG. 15 is a block diagram of an exemplary block diagram illustrating the structure of a general purpose personal computer capable of realizing the method and/or device and/or system according to the embodiments of the present invention.

In FIG. 15, a central processing unit (CPU) 1501 executes various processing according to a program stored in a read-only memory (ROM) 1502 or a program loaded to a random access memory (RAM) 1503 from a memory section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a memory section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the apparatus so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the memory section 1508 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus, comprising:
processing circuitry configured to
receive information of a plurality of secondary systems managed by one or more spectrum coordinators;
determine, based on the information, a graph which represents interference relationships among the plurality of secondary systems;
determine, in accordance with the graph, a result of grouping among the plurality of secondary systems as one or more groups, each of the one or more groups including one or more of the plurality of secondary systems which satisfies a condition of quality of service requirement for the respective group;
control an emitting power of the one or more of the plurality of secondary systems on a basis of group; and
allocate, in accordance with the graph, a spectrum resource to each of the one or more secondary systems of the plurality of secondary systems,
wherein, the information includes at least one of geographical location information and maximum emitting power information, on a basis of each of the plurality of secondary systems.

2. The electronic apparatus according to claim 1, wherein, the processing circuitry is further configured to
create one or more vertexes, wherein each of the one or more vertexes corresponds to the one or more secondary systems of the plurality of secondary systems; and
create one or more edges between the vertexes, wherein the one or more edges are created according to relative interferences among the plurality of secondary systems.

3. The electronic apparatus according to claim 2, wherein, the processing circuitry is further configured to generate an undirected weighted graph as the graph based on the one or more created edges.

4. The electronic apparatus according to claim 1, wherein, the processing circuitry is further configured to
allocate the spectrum resource to the secondary systems based on the result of grouping, such that the spectrum resource allocated to one group of the secondary systems do not interfere with another spectrum resource allocated to another group of the secondary systems.

5. The electronic apparatus according to claim 1, wherein, the processing circuitry is further configured to inform the allocation of the spectrum resource to the one or more spectrum coordinators.

6. The electronic apparatus according to claim 1, wherein, the processing circuitry is further configured to allocate the spectrum resource to the secondary systems further in accordance with the maximum emitting power information of each of the plurality of secondary systems.

7. The electronic apparatus according to claim 1, wherein, the processing circuitry is further configured to receive event indication from at least one of the one or more spectrum coordinators as a trigger to determine the graph, the event indication being generated based on information of network topology changing or quality of service decreasing detected at least one of the plurality of secondary systems.

8. The electronic apparatus according to claim 1, wherein, the processing circuitry is further configured to set a quality of service margin threshold for each group, so that each of the one or more secondary systems belonging to the group adjusts its emitting power according to the quality of service margin threshold.

9. The electronic apparatus according to claim 8, wherein, the quality of service margin threshold is set to limit a maximum value of the emitting power so that the quality of service of the secondary systems belonging to the group do not exceed the quality of service requirement for the respective group.

10. The electronic apparatus according to claim 9, wherein, the processing circuitry is further configured to transmit the quality of service margin threshold set for each group to a spectrum coordinator that manages overlapping area.

11. The electronic apparatus according to claim 1, wherein, the processing circuitry is further configured to allocate spectrum resources in accordance with numbers of the groups.

12. A method for managing an electronic apparatus, comprising:
receiving information of a plurality of secondary systems managed by one or more spectrum coordinators;
determining, based on the information, a graph which represents interference relationships among the plurality of secondary systems;
determining, in accordance with the graph, a result of grouping among the plurality of secondary systems as one or more groups, each of the one or more groups including one or more of the plurality of secondary systems which satisfies a condition of quality of service requirement for the respective group;
controlling an emitting power of the one or more of the plurality of secondary systems on a basis of group; and
allocating, in accordance with the graph, a spectrum resource to each of the one or more secondary systems of the plurality of secondary systems,
wherein, the information includes at least one of geographical location information and maximum emitting power information, on a basis of each of the plurality of secondary systems.

13. The method according to claim 12, wherein, further comprising:
creating one or more vertexes, wherein each of the one or more vertexes corresponds to the one or more secondary systems of the plurality of secondary systems; and
creating one or more edges between the vertexes, wherein the one or more edges are created according to relative interferences among the plurality of secondary systems.

14. The method according to claim 12, wherein, further comprising:
allocating the spectrum resource to the secondary systems based on the result of grouping, such that the spectrum resource allocated to one group of the secondary systems do not interfere with another spectrum resource allocated to another group of the secondary systems.

15. The method according to claim 12, wherein, further comprising:
   informing the allocation of the spectrum resource to the one or more spectrum coordinators.

16. The method according to claim 12, wherein, further comprising:
   allocating the spectrum resource to the secondary systems further in accordance with the maximum emitting power information of each of the plurality of secondary systems.

17. The method according to claim 12, wherein, wherein, further comprising:
   receiving event indication from at least one of the one or more spectrum coordinators as a trigger to determine the graph, the event indication being generated based on information of network topology changing or quality of service decreasing detected at least one of the plurality of secondary systems.

18. A non-transitory computer-readable recording medium that stores a program which causes a computer to execute a method for controlling an electronic apparatus, the method comprising:
   receiving information of a plurality of secondary systems managed by one or more spectrum coordinators;
   determining, based on the information, a graph which represents interference relationships among the plurality of secondary systems;
   determining, in accordance with the graph, a result of grouping among the plurality of secondary systems as one or more groups, each of the one or more groups including one or more of the plurality of secondary systems which satisfies a condition of quality of service requirement for the respective group;
   controlling an emitting power of the one or more of the plurality of secondary systems on a basis of group; and
   allocating, in accordance with the graph, a spectrum resource to each of one or more secondary systems of the plurality of secondary systems,
   wherein, the information includes at least one of geographical location information and maximum emitting power information, on a basis of each of the plurality of secondary systems.

* * * * *